United States Patent
Lohia et al.

(10) Patent No.: US 11,551,102 B2
(45) Date of Patent: Jan. 10, 2023

(54) BIAS DETECTION FOR UNSTRUCTURED TEXT

(71) Applicant: International Business Machines Corporation, Armonk, NY (US)

(72) Inventors: Pranay Kumar Lohia, Bhagalpur (IN); Rajmohan Chandrahasan, Tamilnadu (IN); Himanshu Gupta, New Delhi (IN); Samiulla Zakir Hussain Shaikh, Ahmednagar (IN); Sameep Mehta, New Delhi (IN); Atul Kumar, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 940 days.

(21) Appl. No.: 16/384,605

(22) Filed: Apr. 15, 2019

(65) Prior Publication Data

US 2020/0327424 A1 Oct. 15, 2020

(51) Int. Cl.
*G06N 5/02* (2006.01)
*G06F 16/31* (2019.01)
(Continued)

(52) U.S. Cl.
CPC .............. *G06N 5/02* (2013.01); *G06F 9/445* (2013.01); *G06F 16/31* (2019.01); *G06Q 10/10* (2013.01)

(58) Field of Classification Search
CPC ....................................................... G06N 5/02
(Continued)

(56) References Cited

U.S. PATENT DOCUMENTS 9,015,037 B2   4/2015   Myslinski
9,285,973 B1   3/2016   Gable
(Continued)

FOREIGN PATENT DOCUMENTS

KR   101082589 B1   11/2011
KR   101355956 B1    2/2014
WO   WO2009089116 A2  7/2009

OTHER PUBLICATIONS

Aylin Caliskan et al., "Semantics derived automatically from language corpora necessarily contain human biases", Science 356. 6334, arXiv:1608.07187v4 [cs.AI], May 25, 2017, 14 pages.
(Continued)

*Primary Examiner* — Lihong Yu
(74) *Attorney, Agent, or Firm* — Ference & Associates LLC

(57) ABSTRACT

One embodiment provides a method, including: receiving a target unstructured document for determining whether the target unstructured document comprises biased information; identifying an objective of the target unstructured document by extracting, from the target unstructured document, (i) entities and (ii) relationships between the entities; creating a structured knowledge base, wherein the creating comprises (i) creating an entry in the structured knowledge base corresponding to the target unstructured document, (ii) identifying other unstructured documents having a similarity to the target unstructured document, and (iii) generating an entry in the structured knowledge base corresponding to each of the other unstructured documents; applying a bias detection technique on the structured knowledge base; and providing an indication of whether the target unstructured document comprises bias.

19 Claims, 3 Drawing Sheets

(51) Int. Cl.
*G06Q 10/10* (2012.01)
*G06F 9/445* (2018.01)

(58) Field of Classification Search
USPC .......................................................... 706/46
See application file for complete search history.

(56) References Cited

U.S. PATENT DOCUMENTS

| | | |
|---|---|---|
| 9,495,341 B1 | 11/2016 | Vagell et al. |
| 10,839,013 B1* | 11/2020 | Werris ................. G06F 40/216 |
| 2008/0005778 A1* | 1/2008 | Chen ...................... G06Q 10/10 726/1 |
| 2011/0087682 A1 | 4/2011 | Serjeantson et al. |
| 2012/0158726 A1 | 6/2012 | Musgrove et al. |
| 2015/0100244 A1* | 4/2015 | Hannum ................ G16B 20/10 702/19 |
| 2016/0283470 A1 | 9/2016 | Solomon et al. |
| 2018/0121412 A1 | 5/2018 | Myslinski |

OTHER PUBLICATIONS

Su Lin Blodgett et al., "Racial Disparity in Natural Language Processing: A Case Study of Social Media African-American English", arXiv:1707.00061v1 [cs.CY], Jun. 30, 2017, 4 pages.
Tolga Bolukbasi et al., "Man is to Computer Programmer as Woman is to Homemaker? Debiasing Word Embeddings", arXiv:1607.06520v1 [cs.CL], Jul. 21, 2016, 25 pages.

\* cited by examiner

BIAS DETECTION FOR UNSTRUCTURED TEXT

BACKGROUND

Bias represents a prejudice or unfairness towards a particular group. If a user or an entity has a particular bias, for example, the user likes one sports team over another sports team, this bias can sway the opinion of the user or entity. In situations where decisions have to be made with regard to a user or entity, the user or entity does not want a particular bias to affect that decision. For example, if the user is applying for a home mortgage, job, credit card, school, or the like, the user does not want a particular bias of the decision-making entity to affect the decision. Rather, the user wants the decision to be made using all the same criteria that would be applied to any other user or entity applying for the same thing and without regard to the bias of the decision-making entity. Thus, in decision-making processes, attributes or features that should not be used to influence a decision are referred to as a protected attribute, meaning the attribute cannot be used to influence the decision.

BRIEF SUMMARY

In summary, one aspect of the invention provides a method, comprising: receiving a target unstructured document for determining whether the target unstructured document comprises biased information; identifying an objective of the target unstructured document by extracting, from the target unstructured document, (i) entities and (ii) relationships between the entities; creating a structured knowledge base, wherein the creating comprises (i) creating an entry in the structured knowledge base corresponding to the target unstructured document, from the extracted entities and relationships and other features of the target unstructured document, (ii) identifying other unstructured documents having a similarity to the target unstructured document, and (iii) generating an entry in the structured knowledge base corresponding to each of the other unstructured documents, the entry being generated from entities, relationships between the entities, and other features of the corresponding unstructured document; applying a bias detection technique on the structured knowledge base; and providing, based upon a result of the applied bias detection technique, an indication of whether the target unstructured document comprises bias.

Another aspect of the invention provides an apparatus, comprising: at least one processor; and a computer readable storage medium having computer readable program code embodied therewith and executable by the at least one processor, the computer readable program code comprising: computer readable program code configured to receive a target unstructured document for determining whether the target unstructured document comprises biased information; computer readable program code configured to identify an objective of the target unstructured document by extracting, from the target unstructured document, (i) entities and (ii) relationships between the entities; computer readable program code configured to create a structured knowledge base, wherein the creating comprises (i) creating an entry in the structured knowledge base corresponding to the target unstructured document, from the extracted entities and relationships and other features of the target unstructured document, (ii) identifying other unstructured documents having a similarity to the target unstructured document, and (iii) generating an entry in the structured knowledge base corresponding to each of the other unstructured documents, the entry being generated from entities, relationships between the entities, and other features of the corresponding unstructured document; computer readable program code configured to apply a bias detection technique on the structured knowledge base; and computer readable program code configured to provide, based upon a result of the applied bias detection technique, an indication of whether the target unstructured document comprises bias.

An additional aspect of the invention provides a computer program product, comprising: a computer readable storage medium having computer readable program code embodied therewith, the computer readable program code executable by a processor and comprising: computer readable program code configured to receive a target unstructured document for determining whether the target unstructured document comprises biased information; computer readable program code configured to identify an objective of the target unstructured document by extracting, from the target unstructured document, (i) entities and (ii) relationships between the entities; computer readable program code configured to create a structured knowledge base, wherein the creating comprises (i) creating an entry in the structured knowledge base corresponding to the target unstructured document, from the extracted entities and relationships and other features of the target unstructured document, (ii) identifying other unstructured documents having a similarity to the target unstructured document, and (iii) generating an entry in the structured knowledge base corresponding to each of the other unstructured documents, the entry being generated from entities, relationships between the entities, and other features of the corresponding unstructured document; computer readable program code configured to apply a bias detection technique on the structured knowledge base; and computer readable program code configured to provide, based upon a result of the applied bias detection technique, an indication of whether the target unstructured document comprises bias.

A further aspect of the invention provides a method, comprising: receiving a target unstructured document, wherein a user wants to determine if the target unstructured document contains bias; identifying, from the target unstructured document, entities, relationships between entities, and other facts, wherein the entities, relationships, and other facts correspond to a purpose of the target unstructured document; identifying at least one other unstructured document having a similarity to the target unstructured document, wherein the similarity is based upon a topic of the target unstructured document; extracting entities, relationships between entities, and other facts from the at least one other unstructured document; generating a structured schema from the target unstructured document and the at least one other unstructured document, wherein the generating comprises creating a record for each of the target unstructured document and the at least one other unstructured document, wherein each record is produced from the entities, relationships, and other facts corresponding to the record; determining whether the target unstructured document includes bias, wherein the determining comprises using a bias detection technique for structured documents on the structured schema; and notifying the user whether bias exists in the target unstructured document.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
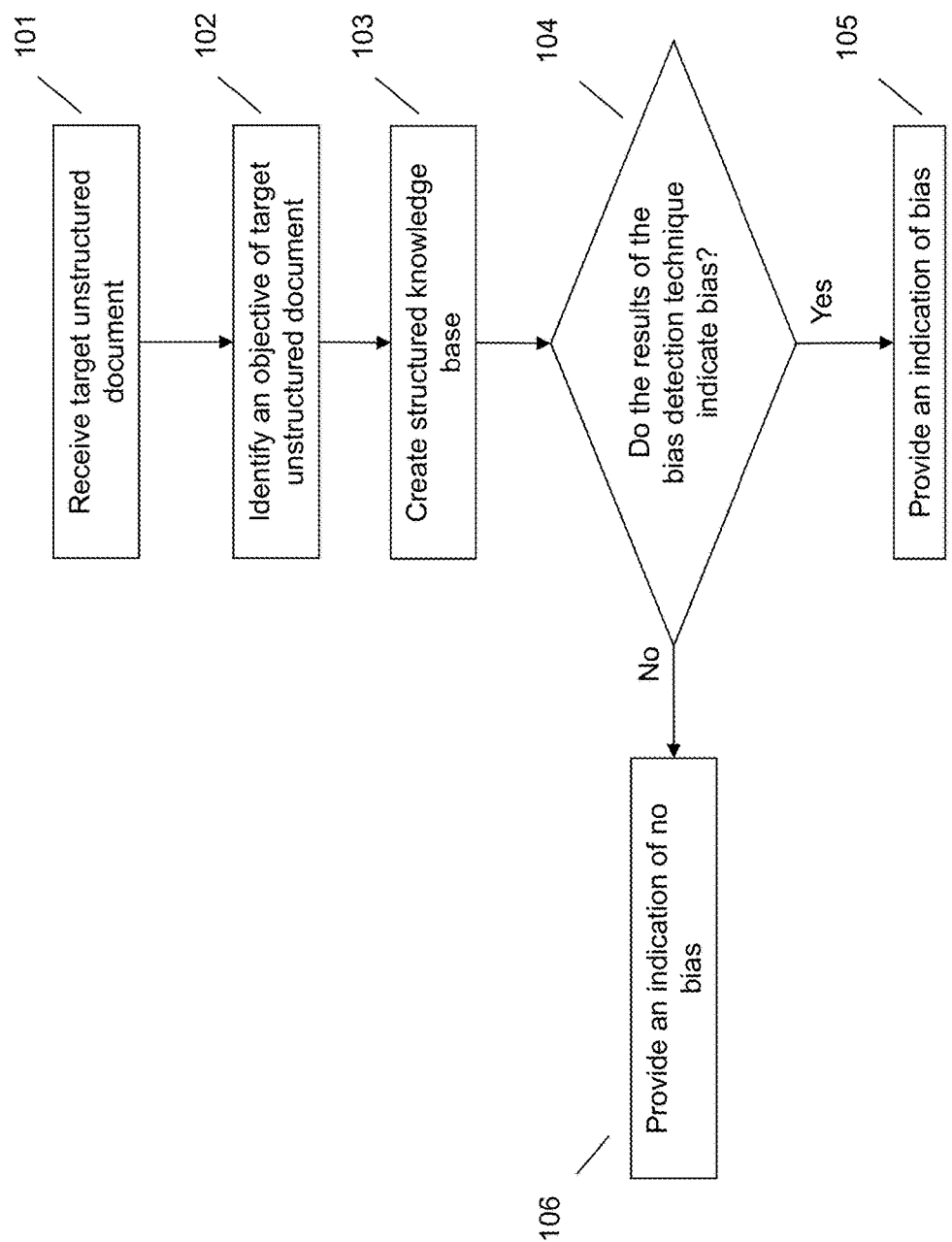
FIG. 1 illustrates a method of detecting bias in an unstructured document by generating a structured dataset from the document and similar documents.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

In making decisions with regard to a user or entity, a decision-making entity may employ a model to assist in the decision-making process. Any attributes that should not influence the decision-making process are labeled as protected and the model does not take those attributes into account when making a decision. These types of decision-making processes and model employment are possible because the information that is being utilized is in a structured format. In other words, the decision-making entity collects information that fits within a structured dataset, where a response by a user to a particular question fits within a particular location or format within the dataset. For example, a user may fill out an application that asks for specific information that fits within a particular format within the dataset. Within the dataset a particular attribute or attributes may be identified as protected and the model can then make a decision regarding the target user or entity using the structured dataset.

However, such a model or bias detection is not possible on unstructured information or on information that does not have a pre-defined format or structure. Examples of unstructured information include news articles, comment sections, social media postings, opinion articles, books, or any other document where a user provides information in the form of natural language text. These unstructured documents may also contain bias, for example, the author may have a strong like or dislike for a particular entity within the document. Therefore, the information provided within the document may not be grounded in facts or in agreement with facts. However, detection of bias within these unstructured documents is much more difficult than detection of bias within a structured document.

This difficulty is based upon the fact that there is not a computer algorithm that can detect bias in the unstructured document. Computer algorithms are able to detect bias in structured documents or structured datasets including protected attributes, as in conventional techniques, but detecting bias in unstructured documents, where the bias is based upon the author's opinion, is very difficult. It is easy to find bias in a structured document because the algorithm knows which columns or entries to analyze and the system knows which attributes are protected, so the algorithm can identify when the data are biased using those protected attributes. However, unstructured documents do not have columns or entries and the identification of protected attributes and/or favorable outcomes is generally unknown. Thus, the conventional techniques for detecting bias in structured documents cannot be applied to unstructured documents.

One conventional technique for detecting bias in unstructured documents is through the use of crowd-sourcing.

Specifically, these techniques rely on other users or readers to identify bias within an unstructured document. The readers can mark the passages or phrases that contain bias. From the crowd-sourced input, a system can calculate a bias rating for the unstructured document. The system can then assign the bias rating to the author of the unstructured document and classify future unstructured documents written by the same author as likely having the same bias. However, this system relies on the readers marking the phrases with bias, which can be highly inaccurate. For example, if the readers themselves have bias, the reader may incorrectly mark something as biased even though it is based on provable fact. Additionally, while the author may have bias with regard to one topic, the author may not have bias with regard to another topic. Thus, a future unstructured document written by the author may be unfairly marked as biased in one direction or the other, when, in fact, the document includes no bias at all. Accordingly, the conventional techniques are often inaccurate, require large amounts of manual user input, and largely ineffective in detecting actual bias.

Accordingly, an embodiment provides a system and method for detecting bias in an unstructured document by generating a structured dataset from the document and similar documents. The system receives a target unstructured document, for example, a news article, comment section, social media posting, opinion article, book, or any other document where a user provides information in the form of natural language text. The target unstructured document is the document that a user, or the author of the document, in interested in, specifically, whether it contains biased information. The system identifies an objective of the target unstructured document by extracting entities and relationships between the entities from the target unstructured document. For example, if the unstructured document is a social media posting discussing referees in a sporting event being more likely to penalize one team over Team A so that Team A will win, the system may determine that the objective is whether referees are biased or not. To determine this objective the system may identify the entities (e.g., referees, Team A, other teams, etc.) and the relationships between these entities (e.g., referees penalizing other teams, Team A playing other teams, etc.).

From the extracted information the system can create a structured knowledge base, also referred to as a structured schema or structured dataset. To generate the structured knowledge base the system creates an entry in the knowledge base for the target unstructured document from the entities and relationships of the entities. Additionally, the system can identify other features or facts corresponding to the event of the unstructured document. The system then identifies other unstructured documents that have a similarity to the target unstructured document. Other similar unstructured documents may include documents that discuss similar events to the target document. Using our sporting example above, similar documents may include documents that discuss other sporting events where Team A played, other sporting events having the group of referees of the target document, and the like. The system then generates entries in the structured knowledge base corresponding to each of these similar documents. These entries would contain the information included in the entry for the target document corresponding to the document of the entry. In other words, the entry of the structured document acts as a template for the entries of the other similar documents.

Once the structured knowledge base is created the system can apply a bias detection technique on the knowledge base. Specifically, the system can apply a conventional structured bias detection technique to the structured knowledge base. The bias detection technique may result in a bias score that can then be used to identify whether the document includes bias. The system then can provide an indication of whether the target unstructured document includes bias.

Such a system provides a technical improvement over current systems for detecting bias. Traditional systems are only able to detect bias in structured documents since the structured document identifies the favorable outcome and protected attributes. Detecting bias in an unstructured document is more difficult because the favorable outcome and protected attributes are unknown. Accordingly, the described system and method provide a technique for detecting bias in an unstructured document, which is not possible using any conventional techniques. Thus, the described system and technique remove the need for readers of documents to mark the documents as biased, thereby reducing the amount of human input needed and also reducing the inaccuracies that can be introduced through human input, as found in the conventional techniques. Additionally, since the system does not require readers to mark biased phrases or passages, the system does not have to store large amounts of user input in order to mark future documents, as with conventional techniques. Additionally, since the system is not based upon user input, the system provides a more accurate and effective technique for identifying bias within an unstructured document than conventional techniques.

FIG. 1 illustrates a method for detecting bias in an unstructured document by generating a structured dataset from the document and similar documents. At 101 the system receives a target unstructured document, for example, a news article, comment section, social media posting, opinion article, book, or any other document where a user provides information in the form of natural language text. The target unstructured document is the document for which a user, for example, an entity, a reader, the author of the document, or the like, wants to determine whether the document contains or includes biased information. In other words, a user is attempting to determine whether the information contained in the target unstructured document is based upon facts and/or is supported by facts. The target document does not need to be the entirety of the document. For example, the target document may simply be a single paragraph, a couple of sentences, a section, or the like, of the document.

Receipt of the document may include any method for obtaining the document. For example, a user may upload the document or provide a location identifier of the document to an application or the system. As another example, the system can retrieve, or otherwise obtain, the document from a data store (e.g., database, local/remote/cloud storage device, etc.), secondary source (e.g., Internet website, scanner or other networked device, social media posting, etc.), or the like. As another example, a user may have the document open, for example, while writing the document, and may access an icon or other access link associated with the bias detection system, which may then cause the bias detection system to analyze the open document.

At 102 the system may identify an objective of the target unstructured document by extracting entities and relationships between the entities from the document. To extract the entities, the system may apply an information extraction algorithm or technique to the document. For example, the system may use syntactic and/or semantic parsing techniques to identify different entities within the document, thereby allowing the system to extract the entities. As another example, the system may use a parts-of-speech tagger to tag different grammatical portions of sentences and paragraphs within the document to identify the entities and relationships between entities. Other information extraction techniques are possible and contemplated.

The entities within the document may be the objects or people that are the focus of the document. In other words, the entities may be those people, corporations, governments, countries, or the like, that are discussed within the document. The system may also identify the relationship between the entities. For example, is the author indicating that one entity favors or has a bias towards another entity? As another example, is the author indicating that without action by one entity, another entity would not perform a corresponding action? The objective of the document is the purpose or goal that the author is attempting to portray or convince the reader of. In other words, the objective is the point that the author is trying to make in writing the document. From the extracted entities, the system can also identify an event that corresponds to the target document. The event may be the underlying feature of the document. In other words, the event may be the focus, topic, or domain of the document.

Figure 2:
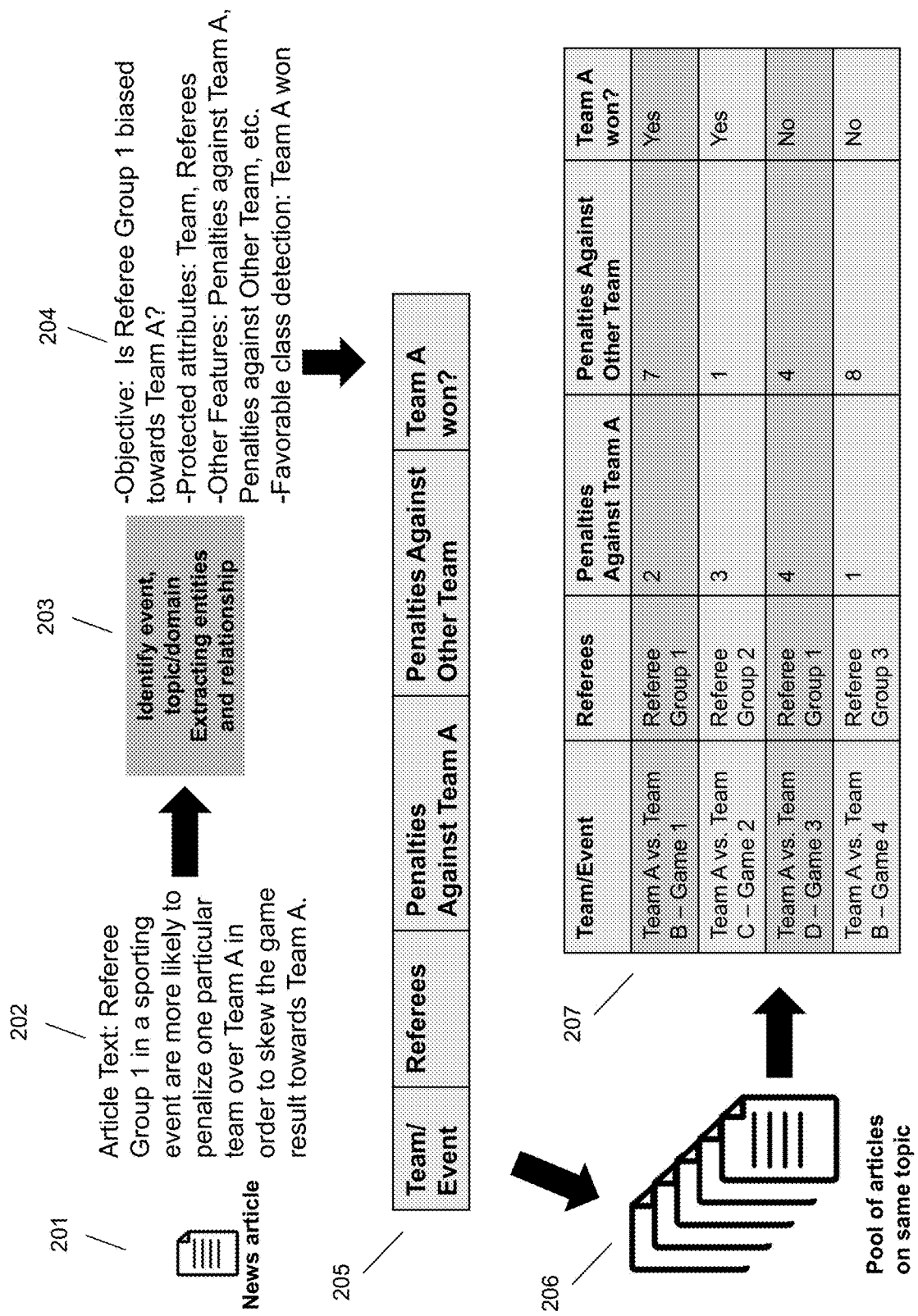
FIG. 2 illustrates an example construction of a structured dataset from unstructured documents.

FIG. 2 illustrates an example creation of a structured knowledge base and includes an identification of events, topics/domains, entities, relationships, and the like. In this example, the unstructured document is a news article 201. Within the text of the news article 202, the author is discussing that Referee Group 1 in a sporting event favors Team A over other teams. Therefore, whenever Referee Group 1 referees a game when Team A is playing, Referee Group 1 penalizes the opposing team more than Team A in order to skew the game result towards Team A. In this example, the system may identify the event (e.g., sporting event with Team A), topic/domain (e.g., Referee Group 1 favoring Team A), and extract entities and relationships (e.g., Referee Group 1, Team A, other teams, Referee Group 1 favoring Team A, Referee Group 1 penalizing other teams, etc.) at 203. From this extraction the system can identify different aspects of the document 204, for example, the objective, "Is Referee Group 1 biased towards Team A?"

At 103 the system can create a structured knowledge base, also referred to as a structured schema or structured dataset. The structured knowledge base is a document, database, application, or other file, that contains information from the target unstructured document and other similar unstructured documents in a structured format, with each document being represented by a single entry within the structured knowledge base. For example, the information may be contained as columns and rows, with each document entry corresponding to a row and attributes from the document corresponding to columns. As another example, the information may be contained as separate tabs within the structured document with each document entry corresponding to a tab, each tab having a specified format. Other structured formats are contemplated and possible.

To create the structured knowledge base, the system must identify the attributes that will be used. The attributes may include some of the entities that were extracted. For example, referring back to the example of FIG. 2, two of the attributes may be the team (e.g., Team A, other team, etc.) and referees (i.e., Referee Group 1, other referee group, etc.). These attributes were derived from the extracted entities. Additional attributes may be derived from other features of the target unstructured document. The other features may be other facts that were included in the document. In the example of FIG. 2, the team/event that was discussed in the news article 201 may be another attribute. Still other attributes may be derived from other or secondary information sources that are related to the unstructured document. These attributes may be other facts that are relevant to the objective, topic, or event of the document, but not specifically discussed within the document itself. For example, the system may access a secondary information source to identify other information. In the example of FIG. 2, the number of penalties against Team A and the number of penalties against the other teams may be derived from a source other than the news article 201.

The system must also identify the favorable class detection. The favorable class detection is the variable or outcome that supports the objective of the document. Thus, the system can define or identify the favorable class detection from the identified objective. In the example of FIG. 2, the favorable class detection is whether Team A won the corresponding game. The favorable class detection is also identified as an attribute within the structured knowledge base. From the attributes, the system can generate a header or other structured format 205. These attributes will be used to define the information that is being captured for each entry within the structured knowledge base. For the target unstructured document entry, the information corresponding to each of these attributes can be populated.

To create the rest of the structured knowledge base, the system identifies other unstructured documents that have a similarity to the target unstructured document and creates a similar document pool 206. A similar document may be identified as a document that discusses a similar event to the one that is discussed in the target document. Using the example of FIG. 2, a similar document may be a document that discusses sporting events where Team A is playing. Another similar document may be a document that includes some of the same entities as the target document. Using the example of FIG. 2, a similar document may be a document discussing a sporting event where Referee Group 1 was refereeing. Determining similar documents may be based upon utilization of a similarity detection technique. Documents identified as similar may be those documents having a similarity distance within a predetermined threshold of the target document.

Once the similar documents are identified, the system can create entries within the structured knowledge base for each of the similar documents. These entries will be a population of the identified attributes 205 for each of the similar documents. In other words, for each attribute that was defined within the structured knowledge base from the target document, the system will populate a value for that attribute for the similar document. Identifying the values for these attributes for the similar documents includes performing many of the steps that were used on the target unstructured document to extract information from the corresponding document. For example, the system may identify and extract entities, relationships between entities, and other facts from the document to identify the values for the attributes. The system may also access secondary information sources to identify attribute values that are not specifically defined within the unstructured document. Using the example of FIG. 2, if the number of penalties for a particular game/event is not identified within the document, the system may access a secondary source to identify these values. The combination of the entries for the target unstructured document and the similar documents creates the structured knowledge base 207.

Since the information included in the target unstructured document and the similar documents is now in a structured format, the system can apply a bias detection technique on the structured knowledge base. Applying a bias detection technique may include comparing the entry of the target document against the entries of the other documents. Comparing the entries against each other can provide an indication of which entries are biased with respect to the other entries. The bias detection technique may be any bias detection technique that can be applied to structured information, for example, group discrimination, individual discrimination, or the like, bias computation algorithms. In order to apply these bias detection techniques, the system must identify the protected attributes. These are the attributes that are identified as features that should not affect the decision. In other words, protected attributes are those attributes that should not be used when making a decision.

Using the example of FIG. 2, the team and/or referee group should not affect the outcome. Thus, these are identified as protected attributes. The protected attributes may be identified as those attributes that the author of the unstructured document is stating does affect the outcome. In other words, in the example of FIG. 2, the author is stating that Referee Group 1 is favorable to Team A. Thus, the system may identify the attribute having the referee groups and the attribute having the team as protected attributes in order to determine if bias is actually present in the document. In other words, the bias detection technique may identify whether bias is present with respect to the protected attribute(s).

Once the bias detection technique has been applied, the system may determine whether the results of the bias detection technique indicate that bias is present in the target document at 104. The bias detection technique may include identifying a distribution of favorable outcomes with respect to the protected attribute(s). A result of the bias detection technique that indicates bias may be a result where this distribution is uneven, or skewed, towards a protected attribute. In other words, if the ratio of favorable outcomes with respect to a protected attribute is above a predetermined threshold, which may be a default threshold, set by a user, or the like, bias may exist within the document. On the other hand, a result of the bias detection technique where the distribution is even or uniform across the protected attribute would indicate that no bias exists.

The result of the bias detection technique may include a bias score. This bias score may provide an indication of how much bias is present in the target document. Thus, determining whether the results indicate bias is present may include comparing the bias score to a predetermined threshold, which may be a default value, defined by a user, or the like. A bias score meeting or exceeding the threshold may indicate that bias is present and a bias score below the threshold may indicate no bias is present. The bias detection technique may also generate statistics that explain how the bias score was generated, for example, which portions of the document had significant amounts of bias, which portions of the document did not align with the facts, what attributes of the document lead to a particular bias score, or the like.

If the results of the bias detection technique do not indicate bias at 104, the system may provide an indication of no bias at 106. If, however, the results of the bias detection technique do indicate bias at 104, the system may provide an indication of bias at 105. Providing an indication of bias or no bias may include providing an indication to a user, for example, on a display device, within an application, sending the indication to a secondary device, or the like. The system may also provide any scores or statistics that were generated or obtained during the bias detection.

Such a system provides an improvement over conventional bias detection techniques by providing a system that can automatically detect bias in unstructured documents, whereas the conventional automated systems can only detect bias in structured documents. Additionally, since the described system is automated, the system does not rely on readers of the unstructured documents to identify and mark bias included in the unstructured document. Therefore, the system does not rely on often inaccurate input provided by other users and does not require large amounts of human involvement in determining whether bias exists in the unstructured document. Additionally, since the system does not rely on user input for detecting bias in the unstructured document, the system can provide accurate results that are not based upon prior works by the same author. Therefore, the results of the bias detection are not influenced by bias that may have existed in a prior unstructured document of the author, thereby making the results of the bias detection more accurate with respect to the target unstructured document. Thus, the described system and method provides a more accurate, effective, and automated technique for detecting bias in unstructured documents than can be found using conventional bias detection techniques.

Figure 3:
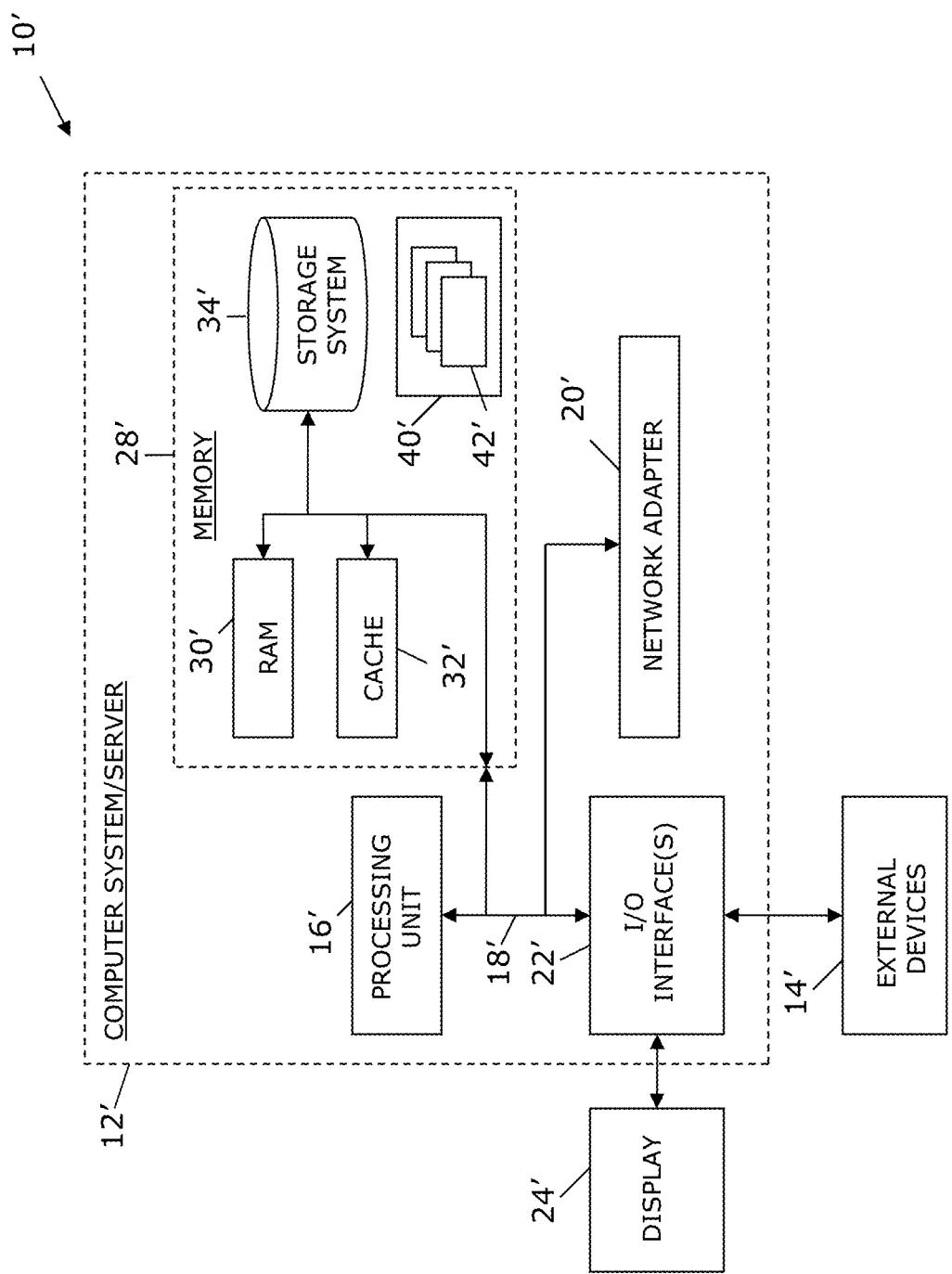
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
receiving a target unstructured document for determining whether the target unstructured document comprises biased information;
identifying an objective of the target unstructured document by extracting, from the target unstructured document, (i) entities and (ii) relationships between the entities;
creating a structured knowledge base, wherein the creating comprises (i) creating an entry in the structured knowledge base corresponding to the target unstructured document, from the extracted entities and relationships and other features of the target unstructured document, (ii) identifying other unstructured documents having a similarity to the target unstructured document, and (iii) generating an entry in the structured knowledge base corresponding to each of the other unstructured documents, the entry being generated from entities, relationships between the entities, and other features of the corresponding unstructured document;
applying a bias detection technique on the structured knowledge base, wherein the applying comprises defining at least one protected attribute corresponding to a feature that should not affect the objective, comparing the entry corresponding to the target unstructured document against entries corresponding to each of the other unstructured documents in view of the at least one protected attribute and identifying, from the comparing, a distribution of favorable outcomes with respect to the at least one protected attribute; and
providing, based upon a result of the applied bias detection technique, an indication of whether the target unstructured document comprises bias, wherein an indication of bias corresponds to an uneven distribution of favorable outcomes above a predetermined threshold.

2. The method of claim 1, wherein the extracting comprises applying an information extraction algorithm to the target unstructured document.

3. The method of claim 1, wherein the other features of the target unstructured document are related to the entities in the target unstructured document and wherein the other features of the target unstructured document are identified from a secondary information source.

4. The method of claim 1, wherein the at least one protected attribute is defined within the structured knowledge base.

5. The method of claim 1, comprising defining a favorable outcome.

6. The method of claim 1, wherein the providing an indication comprises generating a bias score from the bias detection technique; and
wherein a result indicating bias comprises a bias score exceeding a predetermined threshold.

7. The method of claim 6, wherein the providing an indication comprises providing statistics, generated from the bias detection technique, explaining the bias score.

8. The method of claim 1, comprising identifying an event of the target unstructured document from the extracted entities.

9. The method of claim 8, wherein the other unstructured documents comprise unstructured documents discussing events corresponding to the event of the target unstructured document.

10. An apparatus, comprising:
at least one processor; and
a computer readable storage medium having computer readable program code embodied therewith and executable by the at least one processor, the computer readable program code comprising:
computer readable program code configured to receive a target unstructured document for determining whether the target unstructured document comprises biased information;
computer readable program code configured to identify an objective of the target unstructured document by extracting, from the target unstructured document, (i) entities and (ii) relationships between the entities;
computer readable program code configured to create a structured knowledge base, wherein the creating comprises (i) creating an entry in the structured knowledge base corresponding to the target unstructured document, from the extracted entities and relationships and other features of the target unstructured document, (ii) identifying other unstructured documents having a similarity to the target unstructured document, and (iii) generating an entry in the structured knowledge base corresponding to each of the other unstructured documents, the entry being generated from entities, relationships between the entities, and other features of the corresponding unstructured document;
computer readable program code configured to apply a bias detection technique on the structured knowledge base, wherein the applying comprises defining at least one protected attribute corresponding to a feature that should not affect the objective, comparing the entry corresponding to the target unstructured document against entries corresponding to each of the other unstructured documents in view of the at least one protected attribute and identifying, from the comparing, a distribution of favorable outcomes with respect to the at least one protected attribute; and computer readable program code configured to provide, based upon a result of the applied bias detection technique, an indication of whether the target unstructured document comprises bias, wherein an indication of bias corresponds to an uneven distribution of favorable outcomes above a predetermined threshold.

11. A computer program product, comprising:

a computer readable storage medium having computer readable program code embodied therewith, the computer readable program code executable by a processor and comprising:

computer readable program code configured to receive a target unstructured document for determining whether the target unstructured document comprises biased information;

computer readable program code configured to identify an objective of the target unstructured document by extracting, from the target unstructured document, (i) entities and (ii) relationships between the entities;

computer readable program code configured to create a structured knowledge base, wherein the creating comprises (i) creating an entry in the structured knowledge base corresponding to the target unstructured document, from the extracted entities and relationships and other features of the target unstructured document, (ii) identifying other unstructured documents having a similarity to the target unstructured document, and (iii) generating an entry in the structured knowledge base corresponding to each of the other unstructured documents, the entry being generated from entities, relationships between the entities, and other features of the corresponding unstructured document;

computer readable program code configured to apply a bias detection technique on the structured knowledge base, wherein the applying comprises defining at least one protected attribute corresponding to a feature that should not affect the objective, comparing the entry corresponding to the target unstructured document against entries corresponding to each of the other unstructured documents in view of the at least one protected attribute and identifying, from the comparing, a distribution of favorable outcomes with respect to the at least one protected attribute; and computer readable program code configured to provide, based upon a result of the applied bias detection technique, an indication of whether the target unstructured document comprises bias, wherein an indication of bias corresponds to an uneven distribution of favorable outcomes above a predetermined threshold.

12. The computer program product of claim 11, wherein the extracting comprises applying an information extraction algorithm to the target unstructured document.

13. The computer program product of claim 11, wherein the other features of the target unstructured document are related to the entities in the target unstructured document and wherein the other features of the target unstructured document are identified from a secondary information source.

14. The computer program product of claim 11, wherein the at least one protected attribute is defined within the structured knowledge base.

15. The computer program product of claim 11, comprising defining a favorable outcome.

16. The computer program product of claim 11, wherein the providing an indication comprises generating a bias score from the bias detection technique; and wherein a result indicating bias comprises a bias score exceeding a predetermined threshold.

17. The computer program product of claim 16, wherein the providing an indication comprises providing statistics, generated from the bias detection technique, explaining the bias score.

18. The computer program product of claim 11, comprising identifying an event of the target unstructured document from the extracted entities; and wherein the other unstructured documents comprise unstructured documents discussing events corresponding to the event of the target unstructured document.

19. A method, comprising:

receiving a target unstructured document, wherein a user wants to determine if the target unstructured document contains bias;

identifying, from the target unstructured document, entities, relationships between entities, and other facts, wherein the entities, relationships, and other facts correspond to a purpose of the target unstructured document;

identifying at least one other unstructured document having a similarity to the target unstructured document, wherein the similarity is based upon a topic of the target unstructured document;

extracting entities, relationships between entities, and other facts from the at least one other unstructured document;

generating a structured schema from the target unstructured document and the at least one other unstructured document, wherein the generating comprises creating a record for each of the target unstructured document and the at least one other unstructured document, wherein each record is produced from the entities, relationships, and other facts corresponding to the record;

determining whether the target unstructured document includes bias, wherein the determining comprises using a bias detection technique for structured documents on the structured schema, wherein the determining comprises defining at least one protected attribute corresponding to a feature that should not affect the purpose, comparing the record corresponding to the target unstructured document against records corresponding to each of the other unstructured documents in view of the at least one protected attribute and identifying, from the comparing, a distribution of favorable outcomes with respect to the at least one protected attribute; and notifying the user whether bias exists in the target unstructured document, wherein an indication of bias corresponds to an uneven distribution of favorable outcomes above a predetermined threshold.

* * * * *